United States Patent [19]
Novak et al.

[11] Patent Number: 5,746,476
[45] Date of Patent: May 5, 1998

[54] LOAD BEARING AUTOMOTIVE BENCH SEAT ASSEMBLY

[75] Inventors: Miloslav Novak, Glenshaw; Andrew B. Trageser; Isabel M. Summe, both of Pittsburgh; Susan L. Kane, Apollo, all of Pa.

[73] Assignee: Aluminum Company of America, Pittsburgh, Pa.

[21] Appl. No.: 459,928

[22] Filed: Jun. 2, 1995

[51] Int. Cl.$^6$ ...................................... B60N 2/42
[52] U.S. Cl. ................... 297/216.13; 297/452.2; 297/483; 297/232
[58] Field of Search ............ 297/216.13, 216.1, 297/232, 483, 452.2, 452.18

[56] References Cited

U.S. PATENT DOCUMENTS

| | | | |
|---|---|---|---|
| Re. 29,271 | 6/1977 | Barecki | 297/232 X |
| 3,523,710 | 8/1970 | Barecki et al. | 297/216.13 |
| 3,695,696 | 10/1972 | Lohr et al. | 297/483 X |
| 3,827,752 | 8/1974 | Bissinger, Sr. | 297/452.2 |
| 3,893,729 | 7/1975 | Sherman et al. | 297/232 X |
| 4,036,527 | 7/1977 | Faul | 297/232 X |
| 4,060,279 | 11/1977 | Vogel | 297/232 X |
| 4,285,545 | 8/1981 | Protze | 297/483 |
| 4,585,273 | 4/1986 | Higgs et al. | 297/452.18 |
| 4,881,702 | 11/1989 | Slettebak | 297/232 X |
| 5,133,587 | 7/1992 | Hadden, Jr. | 297/233 X |
| 5,244,745 | 9/1993 | Seksaria et al. | 428/59.3 |
| 5,246,271 | 9/1993 | Boisset | 297/483 X |
| 5,390,977 | 2/1995 | Miller | 297/216.13 |
| 5,390,982 | 2/1995 | Johnson et al. | 297/483 X |
| 5,393,116 | 2/1995 | Bolsworth et al. | 296/65.1 |
| 5,441,332 | 8/1995 | Verellen | 297/483 |
| 5,564,785 | 10/1996 | Schultz et al. | 297/452.2 |
| 5,575,533 | 11/1996 | Glance | 297/232 X |
| 5,599,070 | 2/1997 | Pham et al. | 297/483 |

FOREIGN PATENT DOCUMENTS

| | | | |
|---|---|---|---|
| 535414 | 1/1957 | Canada | 297/452.18 |
| 555246 | 4/1958 | Canada | 297/216.13 |
| 812765 | 5/1937 | France | 297/452.18 |
| 1198987 | 8/1967 | United Kingdom | 297/232 |

*Primary Examiner*—James R. Brittain
*Assistant Examiner*—David E. Allred
*Attorney, Agent, or Firm*—Arnold B. Silverman; Thomas R. Trempus

[57] ABSTRACT

An automotive bench seat assembly which may be removable from a vehicle, has a seat, a seatback adjacent to the seat, a pair of relatively spaced stanchions having an upper portion secured to the seat, and a lower floor engaging portion. The seat has a front rail, a rear rail, and a pair of side members connecting the front and rear rails. A pair of belt supporting towers are operatively associated with shoulder belts and serve to transmit impact loads to the floor through the stanchions. The stanchions have upper portions supportingly secured to towers or the rear rail intermediate the ends thereof and to the front rail intermediate the ends thereof. The stanchions have the floor engaging portion positioned inwardly of the side members. Lap belts also transmit impact loads through the stanchions to the floor. The stanchion may be generally V-shaped and have sidewalls composed of reinforced sheet members. Reinforced sheet members may be provided in the seatback and seat.

13 Claims, 7 Drawing Sheets

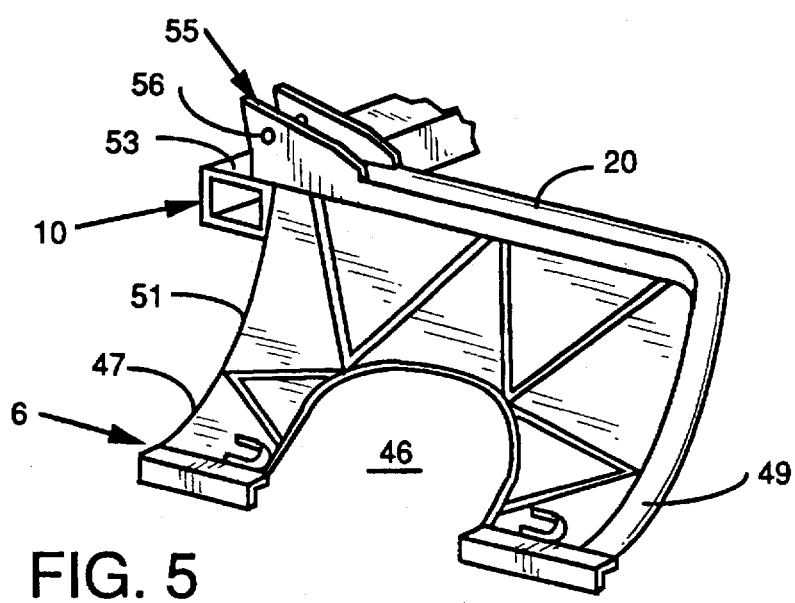
FIG. 5
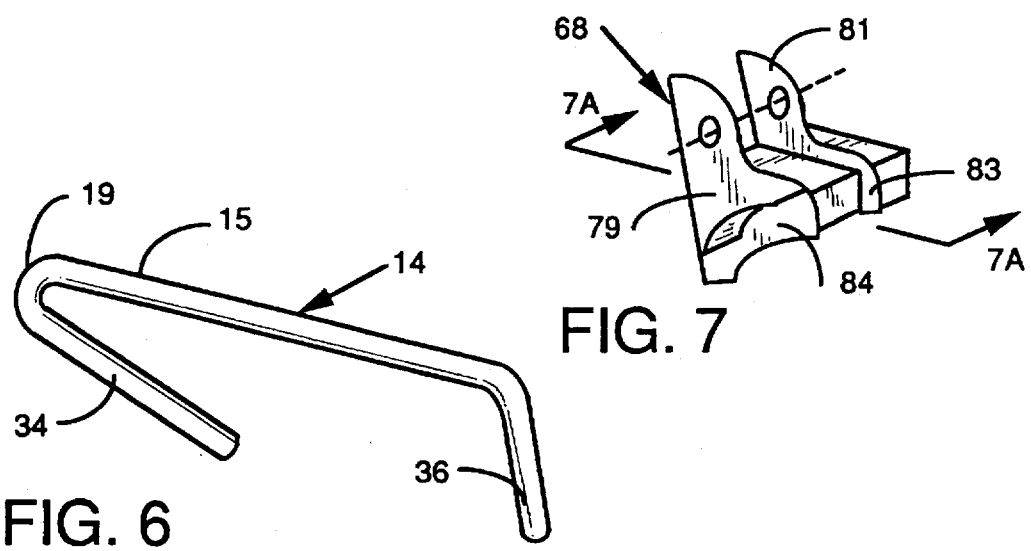
FIG. 6
FIG. 7
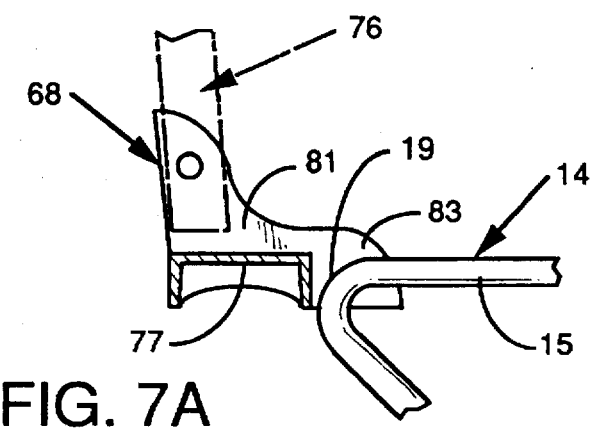
FIG. 7A
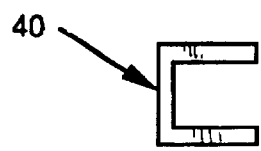
FIG. 8

LOAD BEARING AUTOMOTIVE BENCH SEAT ASSEMBLY

BACKGROUND OF THE INVENTION

1. Field of the Invention

The present invention relates to an improved automotive bench seat assembly which may be removable and provides improved impact load characteristics, particularly, in respect of impact loads applied to either shoulder belts or lap belts, or both.

2. Description of the Prior Art

One of the requirements in certain land vehicles, such as mini-vans and trucks, is the ability to remove a seat when added space is desired, thereby, converting a seating region to a cargo region. In order to provide adequate protection for occupants of the vehicle using the seat, appropriate seat belts are also required. One of the difficulties which has been encountered in past systems, has been the need to provide very bulky and heavy support systems in order to absorb impact loads from rear end or front end collisions. This makes the seat somewhat unwieldy and the extra weight, due to the strength requirement, makes it more difficult to remove and replace the seat.

As it is desirable to have the shoulder belts and lap belts, as well as the support systems therefor, self-contained, such as they are removed with the seat, rather than being anchored in part to the vehicle body, the loads imposed on the belts have typically been transferred to the structural members of the seat. For example, it has been conventional to provide a seat, a seatback, with a pair of seat supports at the sides of the seat member. With the shoulder belt and lap belt forces being transmitted to the rear rail, which cooperates with the front rail and side members to establish the framing for the seat, severe deformation or fracture of the rear rail has occurred as a result of the large moments resulting from the forces applied between the supports for the rear rail. Such applied forces created by impact loads have also been known to weaken welded joints on the seat construction.

Also, placing the seat supports underlying the sides of the seat, frequently makes it difficult for users to pass around the seat as foot access is restricted.

It has been known to employ metal tubes in providing the seat framework, but these had to be cushioned substantially in order to make them reasonably comfortable for the user. While it has also been known to employ sheet metal seatbacks to make the seat more comfortable, these, in general, have lacked adequate strength for the intended purpose.

There remains, therefore, a very real and substantial need for an improved automotive bench seat which will provide desired strength and safety while providing a lighter weight, removable seat with foot clearance being enhanced.

SUMMARY OF THE INVENTION

The present invention has met the above described need. In a preferred aspect of the present invention, an automotive bench seat will have a seat, a seatback adjacent to the seat, and a pair of relatively spaced stanchions having an upper portion secured to the seat and a lower floor engaging portion. The seat will have a front rail, a rear rail, and a pair of side members connecting the front rail and the rear rail. The stanchions have their upper portions supportingly secured to the rear rail intermediate the ends thereof and to the front rail intermediate the ends thereof. The seatback will have a pair of belt supporting towers which are operatively associated with shoulder belts.

The stanchions have an upper portion secured to the front and rear rails and floor contacting portions which are disposed inwardly from the side members of the seat to thereby provide effective foot clearance. The belt supporting towers are generally aligned with at least a portion of the stanchions such that impact loads applied to the shoulder belt will be transferred through the towers to the floor through the stanchions. Similarly, lap belt anchorage to the rear rail will cause impact forces applied thereto to be transferred through the stanchions to the vehicle floor.

In a preferred embodiment, the stanchion will have sidewalls composed of integrally reinforced metal sheet which may have a plurality of projecting frustoconical members, such as those disclosed in U.S. Pat. No. 5,244,745, which is assigned to the assignee of the present invention. A pair of such sheets may be superposed with the free ends of the frustoconical portions being generally aligned and secured to each other.

In a further embodiment of the invention, a pair of superposed sheets which are integrally reinforced by frustoconical deformations may be employed in the seatback to provide enhanced shear strength and stiffness therefor.

It is an object of the present invention to provide an improved automotive, energy absorbing, bench seat which has effective strength to resist impact loads applied by front or rear collisions.

It is a further object of the present invention to provide such a seat which may be employed as a removable vehicle seat and avoids the need to anchor shoulder belts and lap belts directly to the vehicle body.

It is a further object of the present invention to provide a structure which effectively transmits forces from three passengers applied to the seats through belt means to the floor of the vehicle while employing only two stanchions.

It is a further object of the present invention to provide a bench seat construction which has adequate strength to meet the load requirements and yet requires less cushioning for passenger comfort than prior art constructions.

It is a further object of the present invention to provide an energy absorbing automotive bench seat which has a comfortable, stiffened seatback member.

It is a further object of the present invention to provide such an automotive bench seat which is lighter, economical to manufacture, and will resist plastic deformation of the framing members or collapse thereof.

These and other objects of the present invention will be more fully understood from the following description of the invention with reference to the drawings appended hereto.

BRIEF DESCRIPTION OF THE DRAWINGS

FIG. 5 is a portion of a stanchion employable in the seat of FIG. 1.

FIG. 6 is another component of a stanchion employable in the invention.

FIG. 7 is a bracket employable for securing components of the present invention. FIG. 7A is a cross-sectional view through the bracket of FIG. 7 taken along 7A—7A with several cooperating elements of the assembly illustrated.

FIG. 8 is an end view of a floor engaging track member of the present invention.

DESCRIPTION OF THE PREFERRED EMBODIMENTS

As used herein, reference to "automotive" or "vehicle" shall refer to mini-vans, trucks, school buses, as well as other type of land vehicles, water craft and aircraft, where the protective features of the present invention are desired regardless of whether the features are employed in a removable or permanently installed seat.

Figure 1:
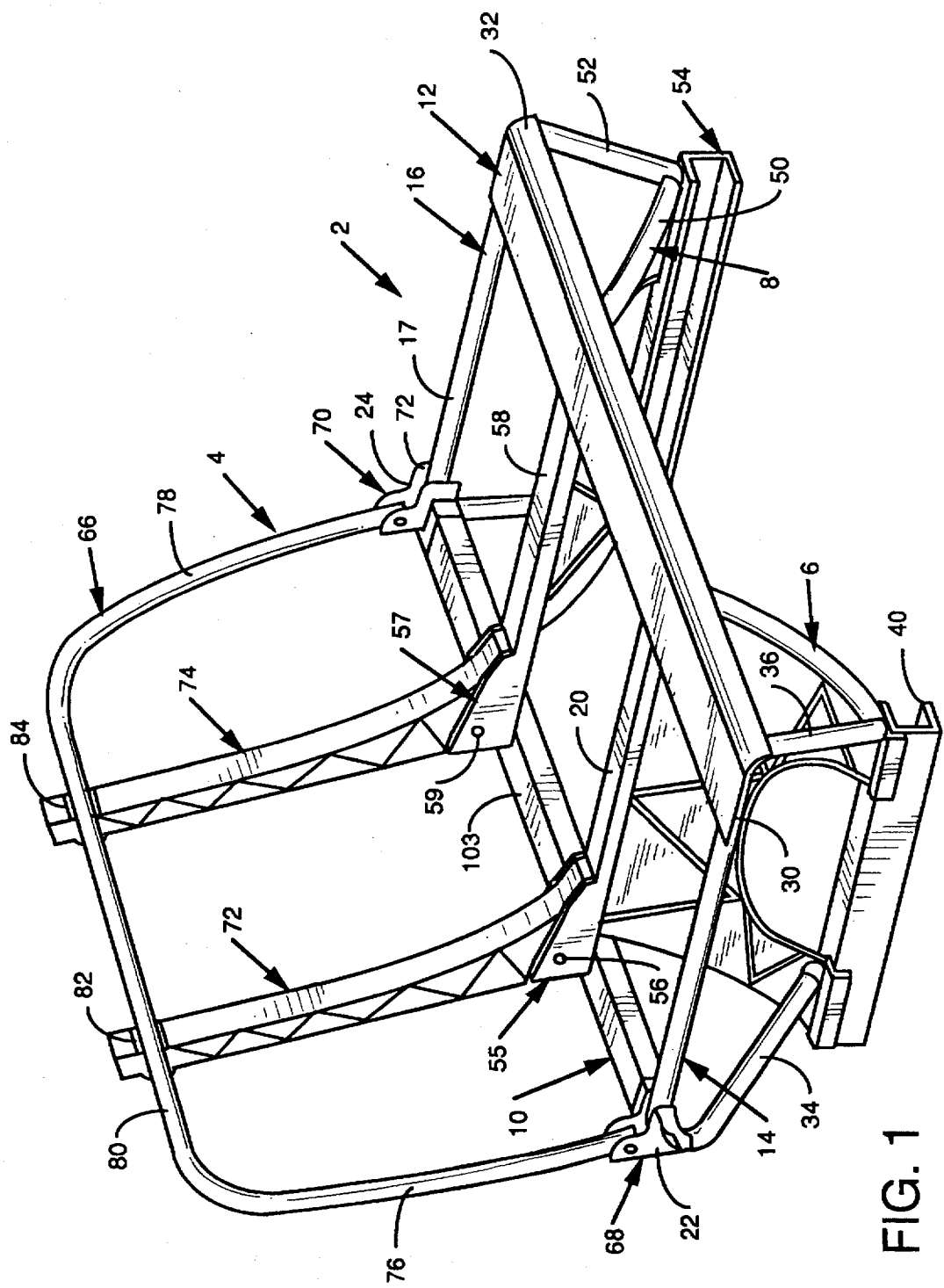
FIG. 1 is a partially schematic perspective view of the main structural components of the automotive bench seat of the present invention.
Figure 2:
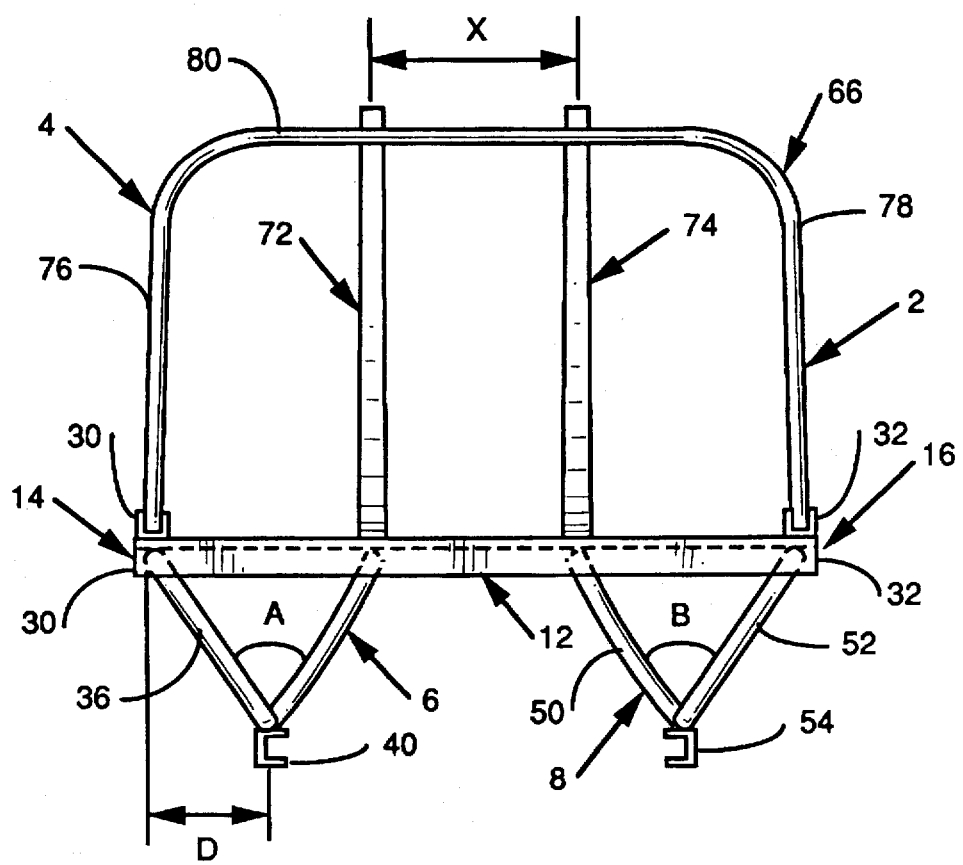
FIG. 2 is a front elevational view of FIG. 1.
Figure 3:
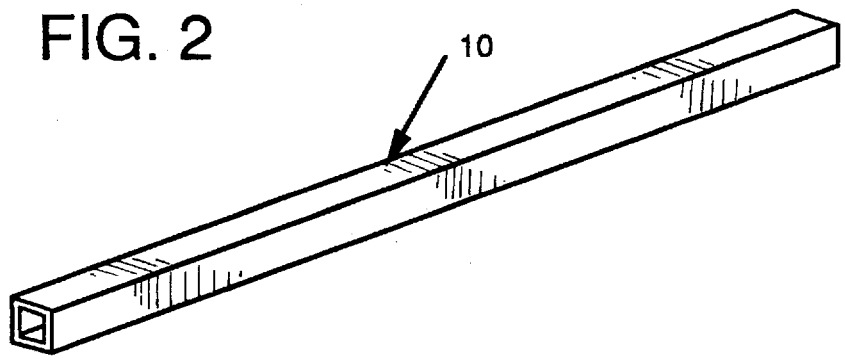
FIG. 3 is a perspective view of a rear rail employable in the seat of FIG. 1.
Figure 4:
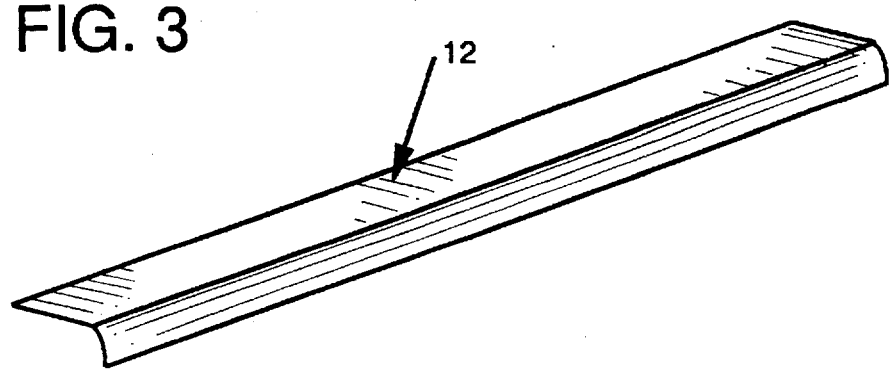
FIG. 4 is a perspective view of a front rail employable in the present invention.

Referring to FIGS. 1 and 2 there is shown the structural framework for one embodiment of the present invention. The bench seat consists of a seat 2, a seatback 4, and supporting stanchion members 6, 8. The bench 2 includes a rear rail 10, a generally parallel front rail 12, and side members 14, 16 (FIG. 3) which, in the form shown, are connected, respectively, to portions of stanchions 6, 8. As shown FIG. 3, the rear rail may be a square aluminum extrusion. The front rail 12 may be an extrusion or may be formed from an aluminum sheet having a generally L-shaped configuration. Stanchion 6 has an upper portion 20, which is secured to the rear rail 10, intermediate ends 22, 24 thereof, and to the front rail 12, intermediate ends 30, 32 thereof. As shown in FIG. 5, the stanchion 6, in the form illustrated, has a cutout portion 46 which reduces the weight and has continuous legs 47, 49, respectively, underlying or adjacent to rear rail 10 and front rail 12. In a preferred embodiment, rear rail 10 may be secured to rear surface 51 and overlying projection 53 as by welding. In the form shown, the seatback is rotatable in a counterclockwise direction about brackets 30, 32 which, respectively, have brackets 68, 70, each having a pair of spaced apertured tabs aligned, respectively, with openings in legs 76, 78 of U-shaped seatback member 66 with suitable mechanical fasteners, such as bolts (not shown) and nuts serving to effect securement of the assemblies while permitting rearward rotation of the seatback. In the form shown, the stanchions 68 are aluminum castings which have upwardly projecting, integrally formed brackets 55, 57. Each bracket 55,57 has a pair of spaced tabs having openings, such as 56, 59 which cooperate, respectively, with aligned openings in the lower portion of towers 72, 74. This facilities the use of mechanical fasteners, such as bolts and nuts (not shown), to resist separation of the towers 72, 74 from the brackets 55, 57, while permitting rearward rotation of the seat. Conventional locking means may be employed to resist undesired seatback rotation. Side member 14 has re-entrant angularly disposed legs 34, 36 as shown in FIGS. 1 and 6. The stanchion member 6 terminates in a floor engaging portion 40 which, in the form shown, is a track member adapted to be secured to the complimentary anchoring means (not shown) secured to the vehicle floor by track elements which may be conventional floor mounted means. The included angle between the stanchion member 6 and side member 14, which consists of portion 15 and legs 34, 36 is preferably about 45° to 135°.

Similarly, stanchion 8, which may be generally the mirror image of stanchion 6, has an angularly disposed portion 50 and an underlying track member 54. Side member 16 has a side rail 17 and re-entrant angularly disposed legs 52 (one not shown) substantially identical to legs 34, 36 of side member 14. Stanchion 8 has an upper portion 58 which is secured to rear rail 10, intermediate ends 22, 24 thereof and to front rail 12 intermediate ends thereof.

It will be noted with reference to FIGS. 2 and 8 that the stanchions 6, 8 engage the floor through floor engaging portions 40, 54, respectively, at a position spaced inwardly from side members 14, 16. The floor engaging portions 40, 54 are channel-shaped and may be removably or permanently secured to the vehicle floor by conventional means. Also, side members 14, 16 slope inwardly, respectively, toward the floor engaging portions 40, 54. This facilitates improved foot clearance for vehicle occupants who are moving around the seat when it is positioned in a vehicle.

Referring to FIGS. 2 and 6, the distance D between the side member portion 15, 17, respectively, (as measured along the floor of the vehicle) and the floor engaging means 40, 50, respectively, center to center, is about 10 to 20 percent of the width of the seat and, preferably, about 14 to 18 percent of the total width of the seat, i.e., the distance between the outermost portions of side members 15, 17 of side members 14, 16. The distance X between towers 72, 74, measured center to center, is about 20 to 60 percent of the width of the seat and, preferably, about 28 to 44 percent of the width of the seat.

As shown in FIG. 1, the seatback has a generally U-shaped frame member 66 which is secured to rear rail 10 by brackets 55, 57, 68, 70. Frame member 66 has legs 76, 78 and connecting portion 80. A detail of a suitable bracket 68, 70 for the seat sides is shown in FIG. 7 and FIG. 7A. The bracket 68 has a base portion 77 which is connected to a pair of spaced, generally parallel apertured tabs 79, 81 through which a bolt (not shown) may pass in securing an apertured lower end of leg 76 with a nut (not shown) securing the connection. Side member 14 has the portion 19 (FIG. 6) connecting upper portion 15 and leg 34 welded to the bracket 68. It may be secured between forward portions 83, 84 of the tabs 79, 81. The rear rail 10 may be welded to the inner side of bracket 68. Similar connections may be made with respect to bracket 70, tower 66, side member 17 and the other end of rear rail 10. It will be appreciated that these means of connecting these components form no part of the invention per se, and other means may be employed, if desired.

Shoulder belt supporting towers 72, 74 are disposed intermediate the ends 22, 24 of the rail and receive portion 80 of the back frame member within forwardly facing notches 82, 84 formed therein.

The towers 72, 74 are preferably secured, as by welding, either to the upper portions of stanchions 6 and 8, as shown in FIG. 1, or to the rear rail 10 in the general regions where the upper portions of stanchions 6, 8 are connected to the rear rail 10, such that impact loads applied to the tower 72, 74 through shoulder belts, in a manner to be discussed hereinafter, will be transmitted through the stanchions 6, 8 to the floor of the vehicle. Similarly, in a manner to be disclosed hereinafter, lap belts will transmit impact forces through the stanchions 6, 8 to the floor. As the specific manner by which the safety belts are secured to the seat forms no part of the invention per se, any desired or conventional means may be employed. The impact loads applied to the belts by passengers will be absorbed and transferred by the structures disclosed herein. In this manner, with the structural support provided in the intermediate portions of rear rail 10 and front rail 12, plastic deformation thereof or undesired fracture is resisted with the loads being transferred to the floor by the stanchions. It will be appreciated that the combination of side member 14 and stanchion 6 provide a generally U-shaped configuration with the side member 14 supporting the seat end and the stanchion 6 supporting the front rail 12 and rear rail 10. This relationship is best seen in FIG. 2.

The towers 72, 74 may be tubular and may be made of steel or aluminum. The remaining structural components of this sheet may be made of the front or extrusions, or in the case of the front rail 12, also by sheet. For example, stanchions 6, 8, respectively, may be made of castings as may the brackets 68, 70 and the towers 72, 74. Aluminum extrusions may be employed in the seatback frame member 66, the rear rail 10, side members 14, 16, and the floor engaging portions 40, 54. The front rail 12 may be conveniently made out of aluminum sheet which has been roll formed or a closed or open extrusion. While preference of casting versus extrusion versus roll forming will depend to an extent upon the specific design parameters, any of these approaches may be employed. With respect to aluminum extrusions, the preferred alloys are those in the 6XXX series, such as 6063 or 6061. A preferred casting alloy would be heat treatable and may preferably be selected from the group consisting of C119, CZ29 and A356. A preferred sheet alloy would be of the 6XXX series with 6111 , 6009, and 6013 being preferred.

The components may be joined by any desired means, such as welding or the use of mechanical fasteners, such as rivets, for example.

It will be appreciated from the foregoing that the stanchion 6, 8 will be so positioned that a downwardly directed force from a tower 72, 74 will be applied to an upper portion of the stanchion 6, 8 which will be in supporting position so as to transmit the load to the floor. The angle of stanchion portion supporting the load with respect to the floor will determine the vectoral component of the force transmitted therethrough.

Figure 9:
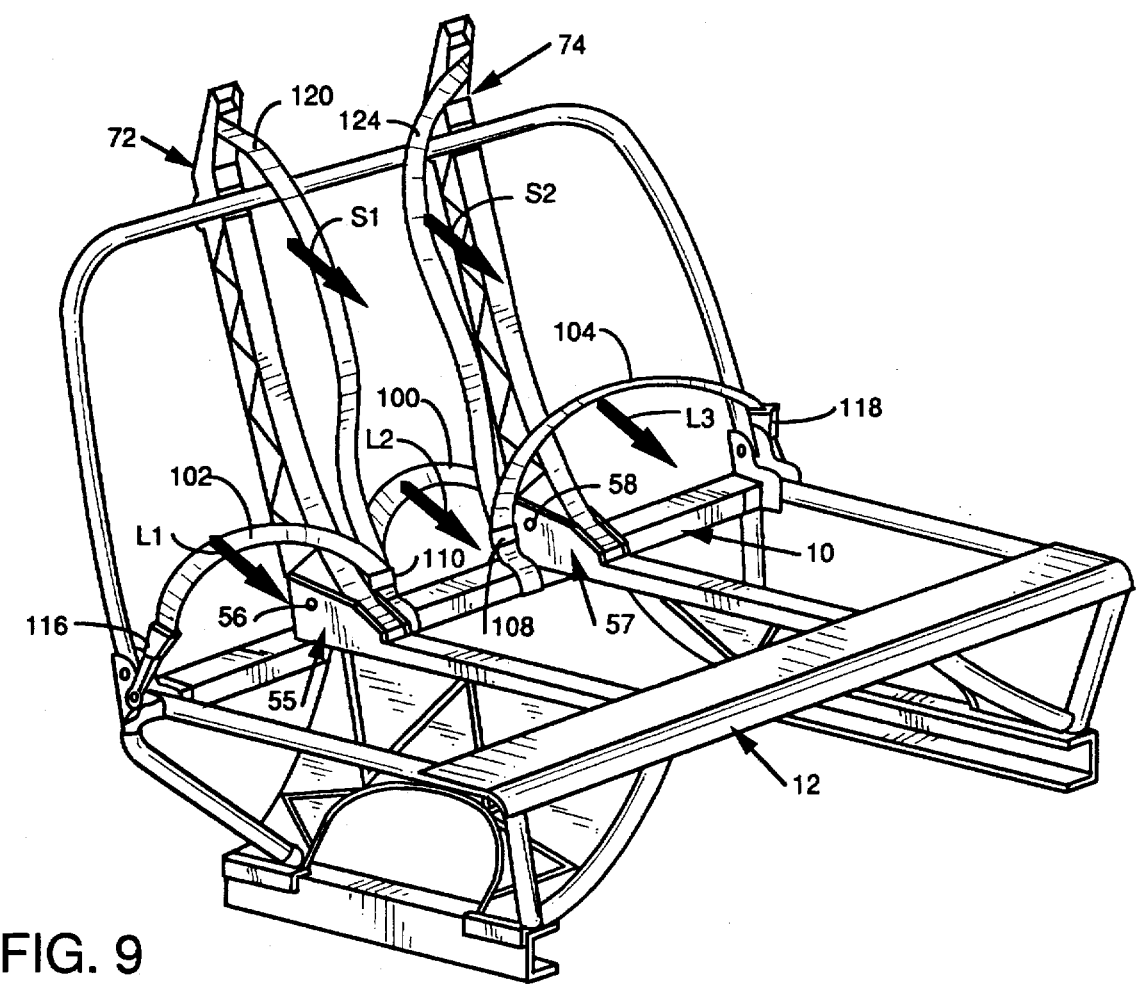
FIG. 9 shows a perspective view of the bench of FIG. 1 with the belts secured thereto.

Referring now to FIG. 9, there is shown the bench of FIG. 1 with the belts in place for a three passenger seat. It will be appreciated that the invention may also be employed with seats holding a different number of passengers, such as two, for example. In the embodiment shown, two of the passengers will have the benefit of shoulder belts and three will have lap belts. As the specific belt locks are not part of the invention, any conventional or desired means may be employed. Assuming that three passengers are seated on the bench seat, the center passenger will have the benefit of lap belt 100 and the adjacent passengers will have lap belts 102, 104. The lap belts 100, 102, 104 are secured to rear rail 10 by having one portion wrapped therearound and having securing means 108, 110, which may consist of mechanical fasteners or welded connections, for example, securing the same. The outer ends of belts 102, 104 are secured, respectively, within conventional latching means 116, 118. Center lap belt 100 may be secured by similar means (not shown).

A first shoulder belt 120 will be secured around the passenger sitting in the lefthand most portion of the seat as viewed in FIG. 9 and shoulder belt 124 will be secured around the passenger sitting in the right-hand most portion of seat as shown in FIG. 9. In the event of an impact providing a shock-load to the vehicle, the forward forces, as shown by L1, L2 and L3, will be applied by the passengers, respectively, to lap belts 102, 100, 104 and forward forces S1 and S2 will be applied, respectively, to shoulder belts 120, 124. It will be appreciated that all of this impact loads of the present invention will be transmitted to the floor through stanchions 6, 8.

If desired, while not shown, headrests may be secured to the upper portion of U-shaped seatback member 66 and project upwardly therefrom or they can be secured to upper portions of towers 73, 74.

Figure 10:
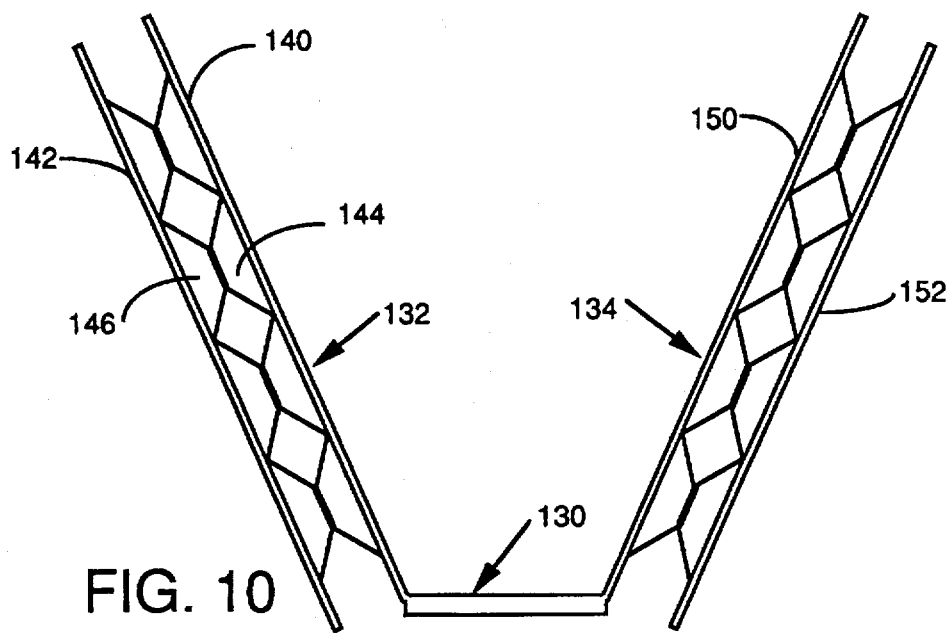
FIG. 10 is a front elevational view of a preferred form of stanchion of the present invention.
Figure 11:
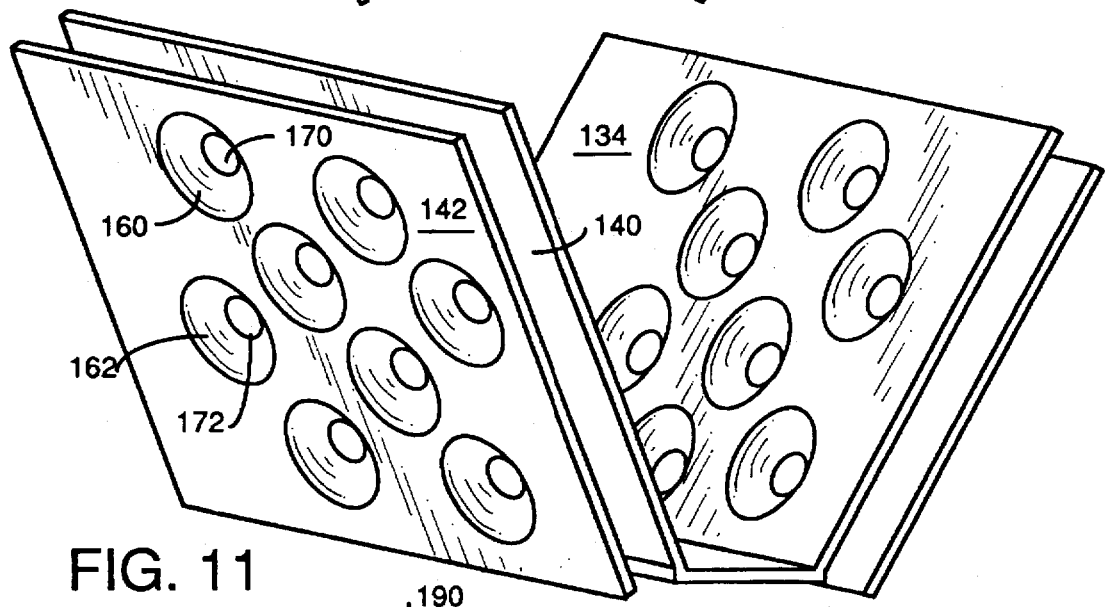
FIG. 11 is a perspective view of the stanchion of FIG. 10.

Referring to FIGS. 10 and 11, there is shown another embodiment of invention wherein the stanchion is generally V-shaped and has a base 130 and a pair of sidewalls 132, 134. The sidewalls are preferably composed of a pair of sheet members with each having integrally formed reinforcing means. For example, sidewall 132 has a first sheet 140 and a second sheet 142, each of which has a plurality of generally, frustoconically-shaped protrusions 144, 146 to reinforce the sheet. In the form illustrated, the protrusions are in aligned relationship and are secured to each other to thereby secure the sheets. These sheets 140, 142 may be secured to each other by spot welding or riveting in the regions where the frustoconical portions 144, 146 touch each other. Similarly, leg 134 has sheets 150, 152. As shown in FIG. 11, sheet 142 has a plurality of frustoconical protrusions, such as 160, 162 which terminate in tops 170, 172, which are generally circular and secured to a corresponding circular portion of the adjacent sheet, as by welding. If desired in this embodiment of the stanchion, one sheet may have reinforcing means and the other may be planar.

Figure 11A:
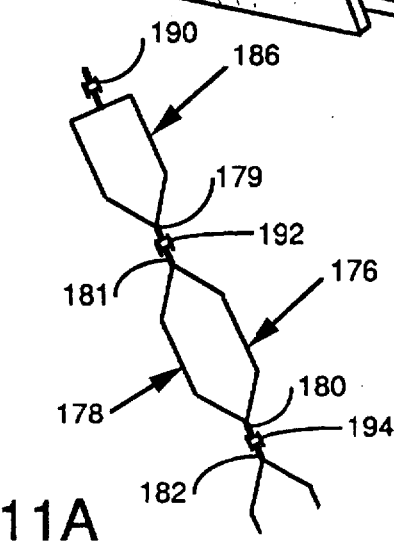
FIG. 11A is a fragmentary illustration of a modification of the embodiment of FIGS. 10 and 11.

FIG. 11A illustrates a preferred structure that may be incorporated in the stanchions of FIGS. 10 and 11. A pair of sheets 176, 178, which may form a leg of the stanchions of FIGS. 10 and 11, has a plurality of integrally formed reinforcing projections 179, 180, 181, 182, for example. The perimeter of the sheets may be provided with an integrally formed hollow beam 186 which may be continuous with profile shown in FIG. 11A and secure three sides of each leg 134, 142. The beam 186 may be secured by rivets, such as 190 or by welding, for example. Rivets 192, 194 join the projections 179, 181 and 180, 182, respectively.

Figure 12:
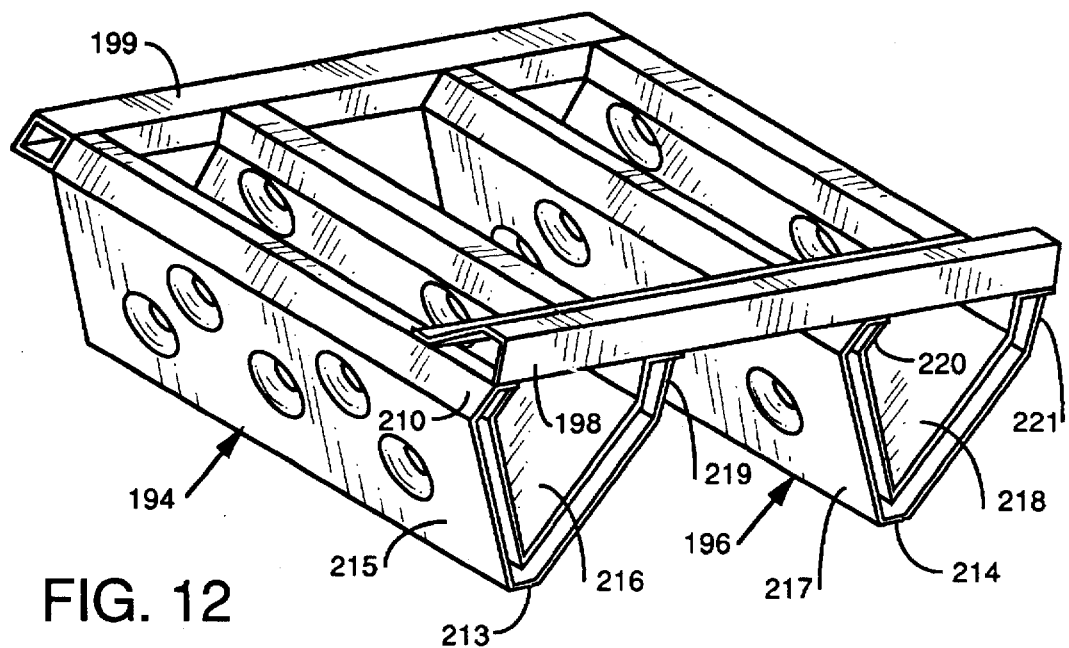
FIG. 12 is a perspective view of two stanchions of the present invention secured to the rear and front rails of the seat.

Referring to FIG. 12, there is shown a preferred form of support of the present invention, wherein two generally V-shaped stanchions 194, 196 which have upper portions secured to the front rail 198 and rear rail 199, both (a) within intermediate portions thereof, and (b) adjacent the sides thereof. The stanchions 194, 196, therefore, provide central support through legs 216 and 217 for the intermediate portions of rails 198, 199 and support legs 215,218 for the ends of the rails 198, 199. The stanchions 194, 196 are each generally V-shaped and have, respectively, floor engaging portions 213, 214, generally diverging leg portions 215–216 and 217–218, which terminate in upwardly projecting, angularly offset portions 210–219 and 220–221, respectively.

Figure 13:
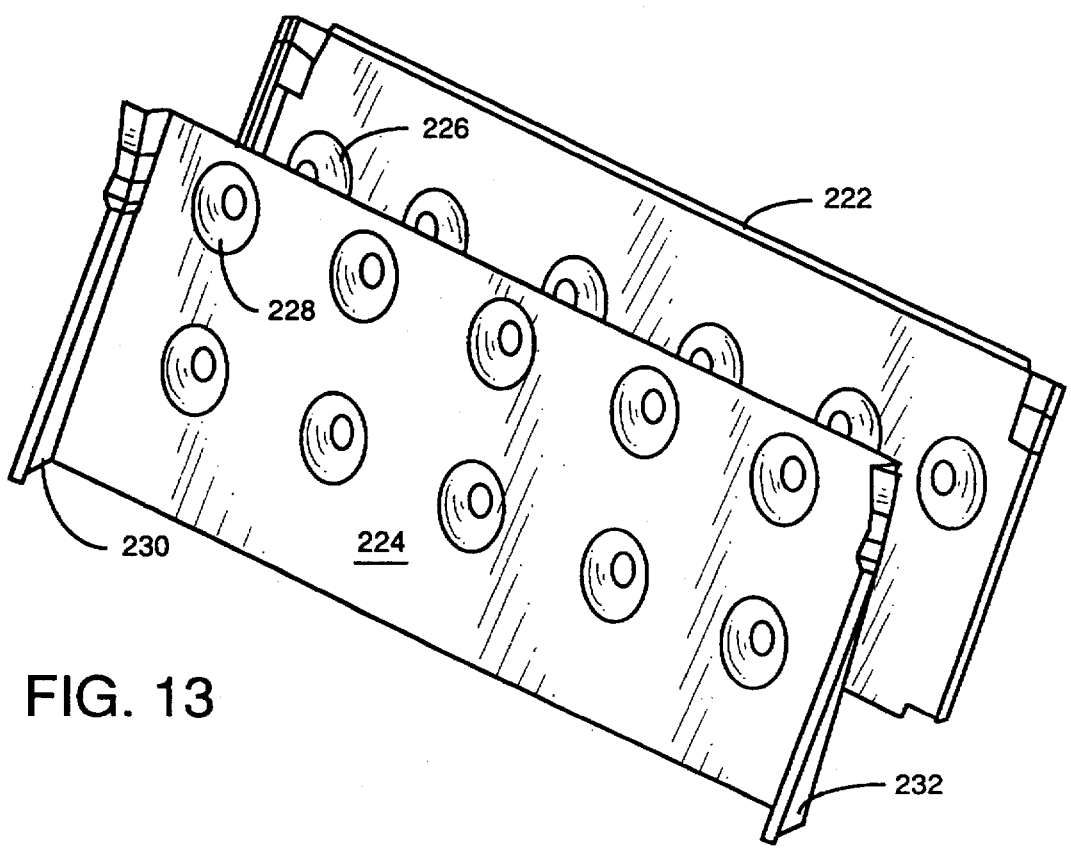
FIG. 13 is a partially exploded view of a form of seatback of the present invention.

Referring now to FIG. 13, there is shown a partially exploded view wherein a modified form of seatback consisting of a pair of integrally forced reinforced sheets 222, 224 have a plurality of frustoconical projections, such as 226, 228 which extend toward each other and may be secured to each other in the same manner as disclosed in respect of FIGS. 10 through 12. If desired, one sheet may be planar and the other may have integrally formed reinforcing means. The sheets 222, 224 may be secured to the rear rail and other portions of the seatback by any desired means which will be well known to those skilled in the art. In the preferred form, the reinforced sheets will be disposed in front of towers 72, 74. As shown in FIG. 13, the sheets 222, 224 have tapered flanges, such as 230, 232, which have greater width toward the bottom where larger moments would be applied in impact loading to resist undesired deformation of the seatback. If desired, this type of reinforced sheet construction could be employed in the seat portion also.

Figure 14:
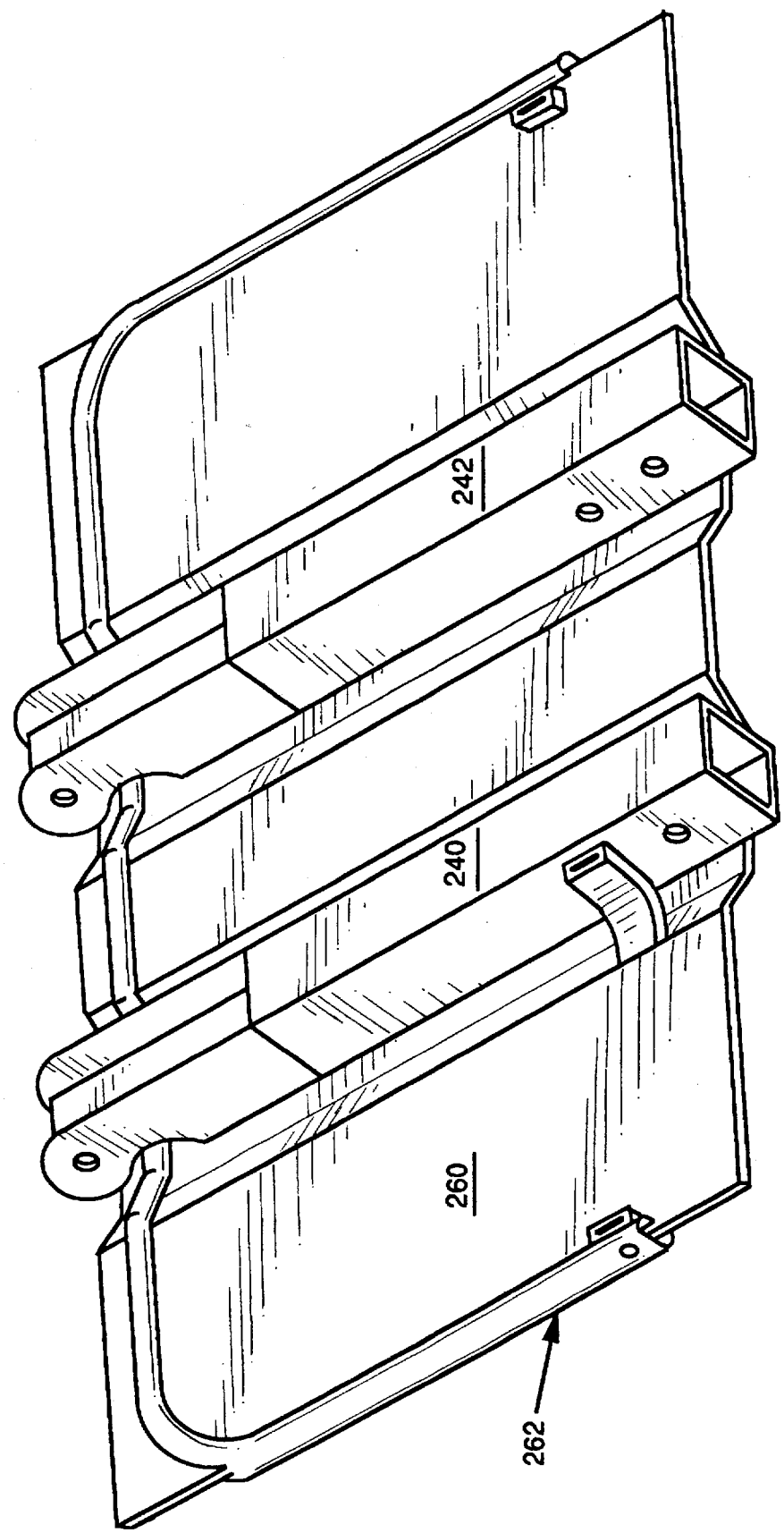
FIG. 14 is a rear perspective illustration of a modified form of seatback usable in the present invention.

Referring to FIG. 14, there is shown a modified form of the invention wherein the towers 240, 242 are disposed behind reinforcing sheet 260 and are received within recesses of seatback sheet 260. The seatback frame 262 has a generally U-shaped member to which the sheet 260, which is disposed in front of it, is secured. This embodiment provides a very stiff seatback.

While the seatback and seat of the present invention will be upholstered for comfort, substantially less cushioning is required than with prior art constructions.

It will be appreciated, therefore, that the present invention provides an improved load bearing automotive bench seat which may be removable and rotatable and provides for effective transfer of impact loads to the vehicle. Improved load bearing seat supports cooperate with a reinforced seatback to provide efficient impact load absorption and transfer. Also, the seat supports provide larger foot clearance for people moving around the bench seat.

Whereas particular embodiments of the invention have been described herein for purposes of illustration, it will be appreciated by those skilled in the art that numerous variations of the details may be made without departing from the invention as described in the appended claims.

We claim:

1. An automotive bench seat assembly comprising
    a seat portion,
    a seatback adjacent to said seat portion,
    a pair of relatively spaced stanchions having an upper portion secured to said seat portion and an elongated lower floor engaging portion,
    said seat portion having a front rail and rear rail and a pair of side members connecting said front rail and said rear rail,
    said side members having generally downwardly and inwardly projecting portions connected to said stanchions,
    said stanchions having upper portions supportingly secured to said rear rail intermediate the ends thereof and to said front rail intermediate the ends thereof, said stanchions extending downwardly and outwardly to engage a vehicle floor,
    said seatback having a pair of elongated relatively spaced belt supporting towers, and
    said towers each having a lower portion generally in line with and pivotly mounted with respect to said upper portion of one of said stanchions to facilitate transfer of load from said belt supporting towers to said stanchions.

2. The automotive bench seat of claim 1 including shoulder belt means operatively associated with said belt supporting towers, whereby impact loads applied to said shoulder belt means will be transferred by said belt supporting towers through said stanchions to said vehicle floor.

3. The automotive bench seat of claim 1 including lap belt means operatively associated with said seat, whereby impact loads applied to said lap belt means will be transferred through said stanchions to said vehicle floor.

4. The automotive bench seat of claim 1 including
    said rear rail having a pair of ends,
    said seatback having a generally U-shaped frame member having both ends secured to said rear rail adjacent said rear rail ends thereof and
    portions of said belt supporting towers being disposed in a rearward position on the opposite side of said generally U-shaped frame member from the side thereof where a seat occupant will be positioned.

5. The automotive bench seat of claim 4 including said belt supporting towers having recesses through which said frame member extends.

6. The automotive bench seat of claim 1 including said seatback having integrally reinforced sheet members disposed in front of said belt supporting towers.

7. The automotive bench seat of claim 1 including
    said side members projecting generally downwardly and, inwardly and
    each said stanchion floor engaging portion being disposed between a respective said side member and said upper portion of said stanchion.

8. The automotive bench seat of claim 1 including said bench seat adapted to be secured to said floor solely at said two floor engaging portions.

9. The automotive bench seat of claim 1 including
    said seat side members having an upper portion and a portion extending downwardly and inwardly therefrom, and
    said floor engaging portions of said stanchions being spaced inwardly from the upper portion of said seat side members.

10. The automotive bench seat of claim 9 including said automotive bench seat being a removable seat.

11. The automotive bench seat of claim 10 including said seatback being rotatable.

12. The automotive bench seat of claim 9 including said floor engaging portions being spaced about 10 to 20 percent of the total width of said seat portion from the outermost side member portions measured along the floor.

13. The automotive bench seat of claim 1 including said towers being spaced center to center about 20 to 60 percent of the total width of said seat portion from each other measured along the floor.

* * * * *